United States Patent
Ejzak et al.

(10) Patent No.: US 7,680,481 B2
(45) Date of Patent: Mar. 16, 2010

(54) METHOD AND APPARATUS FOR LINKING CHARGING RECORDS

(75) Inventors: Richard Paul Ejzak, Wheaton, IL (US); Nick J. Mazzarella, Woodridge, IL (US); Bharat H. Patel, Naperville, IL (US); Thomas Trayer Towle, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 695 days.

(21) Appl. No.: 11/369,597

(22) Filed: Mar. 7, 2006

(65) Prior Publication Data

US 2007/0213031 A1 Sep. 13, 2007

Related U.S. Application Data

(60) Provisional application No. 60/659,157, filed on Mar. 7, 2005.

(51) Int. Cl.
*H04M 11/00* (2006.01)
(52) U.S. Cl. .................. 455/406; 455/445; 455/500; 455/418; 455/412.2; 455/413; 379/114.28; 379/114.01; 379/127.03; 379/112.01; 379/114.21; 370/328; 370/352; 370/389; 370/401.3; 370/445
(58) Field of Classification Search .......... 455/445, 455/500, 418, 412.2, 403, 413, 456.1, 457, 455/406, 67.11; 370/328, 352, 389, 401, 370/356, 395.5, 230, 320, 445, 385; 709/230, 709/231, 227; 379/114, 28, 114.01, 127.03, 379/112.01, 114.21, 114.22, 114.28
See application file for complete search history.

(56) References Cited

U.S. PATENT DOCUMENTS

| | | | | |
|---|---|---|---|---|
| 6,442,257 | B1 * | 8/2002 | Gundlach | 379/114.01 |
| 6,760,324 | B1 * | 7/2004 | Scott et al. | 370/352 |
| 7,035,252 | B2 * | 4/2006 | Cave et al. | 370/356 |
| 2004/0107241 | A1 * | 6/2004 | Jayapalan et al. | 709/203 |
| 2004/0121775 | A1 * | 6/2004 | Ropolyi et al. | 455/445 |
| 2005/0058125 | A1 * | 3/2005 | Mutikainen et al. | 370/354 |
| 2005/0136888 | A1 * | 6/2005 | Koskinen et al. | 455/406 |
| 2005/0201364 | A1 * | 9/2005 | Dalton et al. | 370/352 |
| 2005/0232225 | A1 * | 10/2005 | Pelaez et al. | 370/351 |
| 2006/0003734 | A1 * | 1/2006 | Vallinen et al. | 455/406 |

* cited by examiner

*Primary Examiner*—Rafael Pérez-Gutiérrez
*Assistant Examiner*—Joseph Arevalo
(74) *Attorney, Agent, or Firm*—Fay Sharpe, LLP

(57) ABSTRACT

A method of processing multi-leg calls in a communication network is provided. The method comprises: receiving a call for a user at a first entity in the network; establishing a first call leg to a second entity; generating a first charging data record with at least one field, wherein the field contains a charging identifier for the first call leg; receiving a response from the second entity; establishing a second call leg to a third entity; generating a second charging data record with at least two fields, wherein the first field contains a charging identifier for the second call leg and the second field contains a copy of the charging identifier for the first call leg; and sending the charging data records to a third entity.

15 Claims, 3 Drawing Sheets

METHOD AND APPARATUS FOR LINKING CHARGING RECORDS

CROSS-REFERENCE TO RELATED APPLICATION

This application claims the benefit of U.S. Provisional Application No. 60/659,157 filed Mar. 7, 2005.

BACKGROUND OF THE INVENTION

This invention relates to a method and apparatus for linking charging records generated during multi-leg calls in a telecommunication network.

While the invention is particularly directed to the art. of telecommunications, and will be thus described with specific reference thereto, it will be appreciated that the invention may have usefulness in other fields and applications.

By way of background, wireless telecommunication networks, which are well known, allow mobile devices to communicate with each other and other networks, such as the Internet and the Public Switched Telephone Network (PSTN). First and second generation wireless telephone systems are generally constrained in the amount of bandwidth available for communication, which limits capacity and also the types of services that can be provided. Third generation (3G) wireless systems, such as the IP Multimedia Subsystem (IMS) which are being developed through the 3rd Generation Partnership Project (3GPP), hold the promise of greater bandwidth, thereby increasing capacity and allowing for enhanced services, such as multimedia services.

Thus, 3GPP is becoming the new worldwide standard for the creation, delivery, and playback of multimedia over new, high-speed wireless networks. 3GPP enables the free sharing of multimedia files between a variety of devices, including cell phones, personal digital assistants (PDAs), and notebook and desktop computers. 3GPP devices include, in addition to a voice communication interface, capability for communication of data and display of data, including video.

Of course, the systems of multiple network operators may be used to carry a given call and such operators may levy charges for the services they provide in connection with the call. As a result, the IMS network entities involved in a session generally send accounting information to a CCF (Charging Collector Function) located in the same domain. The CCF will collect all this information and build a CDR (Charging Data Record), which is sent to the Billing Domain (BD). Each session carries an ICID (IMS Charging Identifier) as a unique identifier. This helps operators to track the charges for a call. The current standards, however, do not work as well when it comes to charging for multiple call legs on a single call.

The standards allow for certain entities in the IMS under certain circumstances to generate multiple outgoing call legs for a single incoming event. A call leg refers to the one-to-one signaling relationship between two user agents. And a call is a collection of call legs. In the call control specification, additional call legs are created through special mechanisms, as known to those skilled in the art. There are several reasons that multiple call legs may be generated: Redirection to realize call forwarding, Refer to realize call transfer and conferencing, Retry on Error, and Serial and Parallel Forking. The standards indicate that in some cases, all call legs are assigned the same ICID but leave some cases unspecified. As a result, when multiple call legs occur during a call, the charging system will typically receive charging records from the various IMS nodes associated with the different branches of the request, all with the same ICID. There is insufficient information to uniquely identify the records associated with a particular leg or to determine the sequence in which the legs were created. As a result, it is possible that only the final successful call leg will be charged, even when, for example, the final node on a preceding leg causes a redirection to a different user.

By way of example, call processing functionality as defined in 3GPP TS 23.228 and RFC 3261 currently provides for redirection (3GPP TS 23.229 clause 5.11.5 and RFC 3261 section 8.1.3.4), and the charging data is contained in the Accounting Request (ACR) and the Charging Data Record (CDR) (Tables 6.4 to 6.10) as defined in 3GPP TS 32.260 for Offline Charging. The current procedures allow for an IMS entity to handle a redirection response (e.g., "302") by initiating a subsequent INVITE request to the new destination identified by the contact header in the redirection response with an ICID different from the original call leg.

However, the current IMS specifications for the redirection of calls between IMS entities do not clearly explain how the identification of each successive call leg is stored and correlated to one another. For billing purposes, such correlation is necessary to bill all appropriate parties in a redirected call. The ACRs and CDRs do not include any information related to redirection of calls. Since the redirecting and redirected call legs have separate CDRs with different ICIDs, the network operator's Billing Domain cannot identify the entity that initiated a redirect and cannot associate a redirected call leg with the incoming call. Similar problems may occur with respect to Refer, Retry on Error, and Serial and Parallel Forking.

Accordingly, the present invention contemplates a new and improved method and apparatus that resolves the above-referenced difficulties and others.

SUMMARY OF THE INVENTION

A method, system and apparatus for linking charging records generated during multi-leg calls in telecommunication networks are provided.

In one aspect of the invention a method of processing multi-leg calls in a communication network is provided. The method comprises: receiving a call for a user at a first entity in the network; establishing a first call leg to a second entity; generating a first charging data record with at least one field, wherein the field contains a charging identifier for the first call leg; receiving a response from the second entity; establishing a second call leg to a third entity; generating a second charging data record with at least two fields, wherein the first field contains a charging identifier for the second call leg and the second field contains a copy of the charging identifier for the first call leg; and sending the charging data records to a fourth entity.

In another aspect of the invention, a system for processing multi-leg calls in a communication network is provided. The system comprises: means for receiving a call for a user at a first entity in the network; means for establishing a first call leg to a second entity; means for generating a first charging data record with at least one field, wherein the field contains a charging identifier for the first call leg; means for receiving a redirection response from the second entity; means for establishing a second call leg to a third entity; means for generating a second charging data record with at least two fields, wherein the first field contains a charging identifier for the second call leg and the second field contains a copy of the charging identifier for the first call leg; and means for sending the charging data records to a fourth entity.

In yet another aspect of the invention, an apparatus is provided. The apparatus is operative to: receive a call for a user; establish a first call leg to a first entity; generate a first charging data record with at least one field, wherein the field contains a charging identifier for the first call leg; receive a redirection response from the first entity; establish a second call leg to a second entity; generate a second charging data record with at least two fields, wherein the first field contains a charging identifier for the second call leg and the second field contains a copy of the charging identifier for the first call leg; and send the charging data records to a billing entity.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

For simplicity and ease of reference, the acronyms listed below shall be used in the specification to refer to structural and/or functional network elements, relevant telecommunications standards, protocols and/or services, terminology, etc., as they are commonly known in the telecommunications art, except to the extent they have been modified in accordance with aspects of the present invention.

Figure 1:
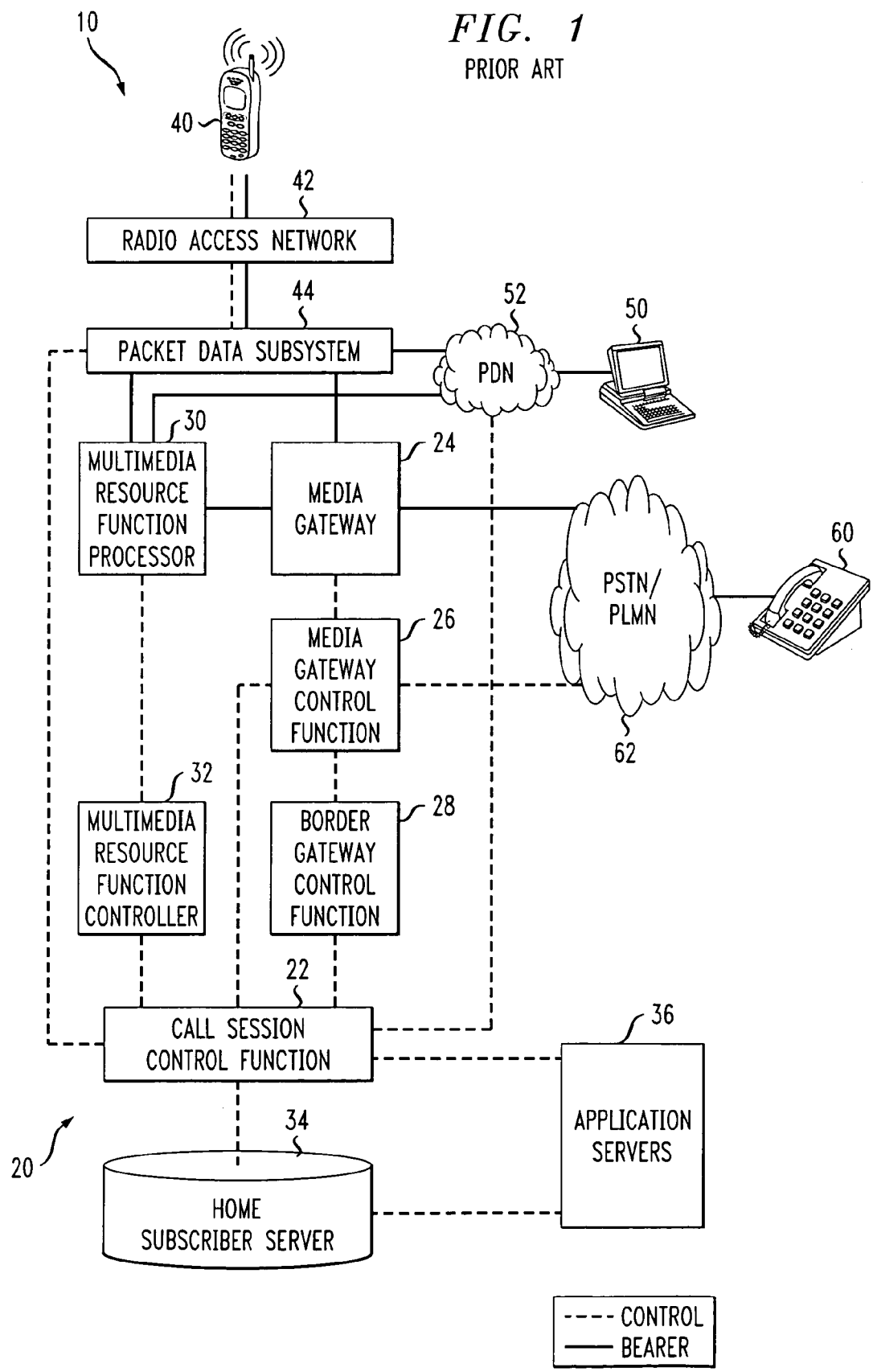
FIG. 1 is a block diagram showing a known multimedia telecommunications network suitable for practicing aspects of the present invention.

3G—3rd Generation
3GPP—3rd Generation Partnership Project
ACR—Accounting Request
AS—Application Server
BD—Billing Domain
BGCF—Border/Breakout Gateway Control Function
CDF—Charging Data Function
CDR—Charging Data Record
CGF—Charging Gateway Function
CSCF—Call Session Control Function
CTF—Charging Trigger Function
HLR—Home Location Register
HSS—Home Subscriber Server
ICID—IMS Charging Identifier
IMS—IP Multimedia Subsystem
IP—Internet Protocol
ISUP—ISDN User Part
MGCF—Media Gateway Control Function
MGW—Media Gateway
MRFC—Multimedia Resource Function Controller
MRFP—Multimedia Resource Function Processor
PDN—Public Data Network
PDS—Packet Data Subsystem
PLMN—Public Land Mobile Network
PSTN—Public Switched Telephone Network
RAN—Radio Access Network
SIP—Session Initiation Protocol
UMTS—Universal Mobile Telecommunications System Referring now to the drawings wherein the showings are for purposes of illustrating the preferred embodiments of the invention only and not for purposes of limiting same, FIG. 1 provides a block diagram of a known multimedia telecommunications network 10 suitable for implementing aspects of the present invention. The multimedia telecommunications network 10 provides users with a variety of options for communication. Users are able to transmit and receive multimedia communications, including audio, voice, video, and all types of data. The multimedia telecommunications network 10 provides access to data networks, such as the Internet, and public telephone networks, including wireless networks. It is to be understood, however, that other such networks may be suitable for implementing aspects of the present invention.

The multimedia telecommunications network 10 preferably includes an IP Multimedia Subsystem (IMS) 20, which is well known in the art. The IMS 20 relates to a technology standardized by the 3rd Generation Partnership Project, also known as 3GPP, and is used to join mobile communication with IP technologies by adding the ability to deliver integrated voice and data services over the IP-based packet switched network. IMS services are based on the Session Initiation Protocol (SIP), which is the signaling protocol standard for next-generation 3GPP mobile wireless networks. The IMS 20 typically includes any number of system elements, such as a Call Session Control Function (CSCF) 22, at least one Media Gateway (MGW) 24, a Media Gateway Control Function (MGCF) 26, a Border Gateway Control Function (BGCF) 28, a Multimedia Resource Function Processor (MRFP) 30, a Multimedia Resource Function Controller (MRFC) 32, a Home Subscriber System (HSS) 34, and Application Servers (AS) 36. As is known in the art, the IMS 20 manages call sessions and provides and administers packet switching for multimedia communications within the network 10.

A first communication device 40 is shown in FIG. 1. The first communication device 40 is shown as a wireless device (or mobile station), which includes a user interface and an interface for coupling to a radio access network (RAN) 42. The user interface of the mobile station 40 is typically referred to as terminal equipment and generally includes an audio interface, such as a microphone and speakers, a visual interface, such as a display, and a user input interface, such as a keyboard or touch pad. Preferably, the mobile station 40 and the base stations in the RAN 42 communicate over-the-air using a packet-based protocol. A packet data subsystem (PDS) 44 couples the RAN 42 with the IMS 20 and the public data network (PDN) 52 in the usual manner.

A second communication device 50 is shown as a laptop or notebook computer operatively connected to the IMS 20 via the PDN 52. A third communication device 60 is shown as an ordinary telephone equipped to handle only voice communications. The telephone 60 is operatively connected to the IMS 20 via the Public Switched Telephone Network/Public Land Mobile Network (PSTN/PLMN) 62.

Only three communication devices (40, 50, and 60) are shown in FIG. 1 for the purpose of simplifying the diagram.

However, it is to be appreciated that any number of such devices are typically situated in the multimedia telecommunications network 10. Additionally, while each is depicted as a specific type of communication device, other like devices may also be incorporated.

With continuing reference to FIG. 1, the bearer paths that carry (or relay) the communication traffic and/or user information for transmission from one terminal to another, which are known in the art, are shown as solid lines. Control paths carry associated signaling and/or control commands (or messages) to and between appropriate network elements for the purpose of managing and routing call sessions. The control paths are shown as dashed lines in FIG. 1. Suitably, SIP and other known protocols are used on the control and bearer paths, respectively. For example, the known Media Gateway Control Protocol ITU-T H.248 protocol is suitably employed for media gateway control. The CSCF 22, the BGCF 28, the MGCF 26, the MRFC 32 and the AS 36 comprise the call control and signaling functionality for the IMS 20, while the bearer paths interface with the MRFP 30 and the MGW 24 to provide and support interconnectivity to external networks and/or subsystems, such as the PDS 44, the PDN 52 and the PSTN/PLMN 62.

Several roles of SIP servers or proxies, collectively called CSCF (Call Session Control Function), are used to process SIP signaling packets in the IMS. For example, a P-CSCF (Proxy-CSCF) is a SIP proxy that is the first point of contact for the IMS terminal. It can be located either in the visited network (in full IMS networks) or in the home network (when the visited network is not IMS compliant yet). An I-CSCF (Interrogating-CSCF) is a SIP proxy located at the edge of an administrative domain. Its IP address is published in the DNS of the domain, so that remote servers (e.g., a P-CSCF in a visited domain, or an S-CSCF in a foreign domain) can find it, and use it as an entry point for all SIP packets to this domain. An S-CSCF (Serving-CSCF) is the central node of the signaling plane. It is a SIP server, but performs session control as well. It is always located in the home network.

The MGW 24 acts as a bearer path interface between different transport networks, and provides translation resources and resources for modifying the bearer stream (e.g., encoding, transcoding, compression, packetization, depacketization, etc.). The bearer path control elements include the MGCF 26, and the MRFC 32. These elements provide the flexibility to control the bearer by adding, modifying or deleting bearers on the MGW 24/MRFP 26 respectively that are used by the users' services. More particularly, the MGW 24 interacts with the MGCF 26, which interprets signaling coming from the CSCF 22 and controls the MGW 24 to achieve resource allocation, bearer path control, and payload processing. The MGCF 26 performs call control protocol conversion between SIP and the PSTN call control protocol, for example, ISDN User Part (ISDN), and it also controls the resources in an MGW with a H.248 interface. Similarly, the MRFC 32 controls the media stream resources in the MRFP 30, which also acts as a bearer path interface between the IMS 20 and external networks and/or subsystems, while being able to provide for conferencing or multiple party communications or other more advanced media services (relative to the MGW 24). The BGCF 28 selects the proper MGCF 26 for calls directed to the PSTN 62.

The HSS 34 is coupled to the CSCF 22. The HSS 34 includes subscriber profile information, including information traditionally associated with a home location register (HLR) for a mobile subscriber. Suitably, the HSS 34 stores information such as user identification, user security information, including network access control information for authentication and authorization, user location information for user registration and locating, and user profiles, including identification of the services subscribed to and other service specific information.

The Application Servers (AS) 36 host and execute services, and interfaces with the S-CSCF using SIP. This allows an easy integration and deployment of value added services to the IMS infrastructure. Some examples of such services are: caller ID related services, call waiting, call holding, push to talk, call forwarding, call transfer, announcement services, conference call services, and voicemail.

The CSCF 22, the MGCF 26, the MGW 24, the HSS 34, and the AS 36 are all functions that may reside in one or more processor-based devices. These devices execute programs to implement the functionality described herein and generally associated with 3GPP/3GPP2 wireless systems. The flexibility of these processor-based systems permits ready integration into these systems of a method for linking charging records for multi-legged calls in accordance with the present invention. It should be noted, however, that as utilized herein, the term "processor" is not intended to refer exclusively to hardware capable of executing software.

Activities utilizing network infrastructure and related services are known as "chargeable events." Chargeable events may include: (a) user to user communication (e.g. a single call, a data communication session or a short message); (b) user to network communication (e.g. service profile administration); (c) inter-network communication (e.g. transferring calls, signalling, or short messages); (d) mobility (e.g. roaming or inter-system handover); and (e) any other activity that the network operator wants to charge for.

"Charging" is a function whereby information related to a chargeable event is formatted and transferred in order to make it possible to determine usage for which the charged party may be billed. The charging function necessarily includes the settlement of invoices among the serving parties (subscriber, network and content provider). The price of network usage must also be settled between the network providers in case of roaming. The real money transaction between the parties (including the user) is usually obliged by contracts. In offline charging, charging information is gathered after the requisition, and so, the subscriber account is debited after the service. Since this information is collected after the event/service, and sent through a network, real-time charging is generally not possible. The online charging mode assures that services are applied only if the subscriber has the necessary amount of money for them.

Figure 2:
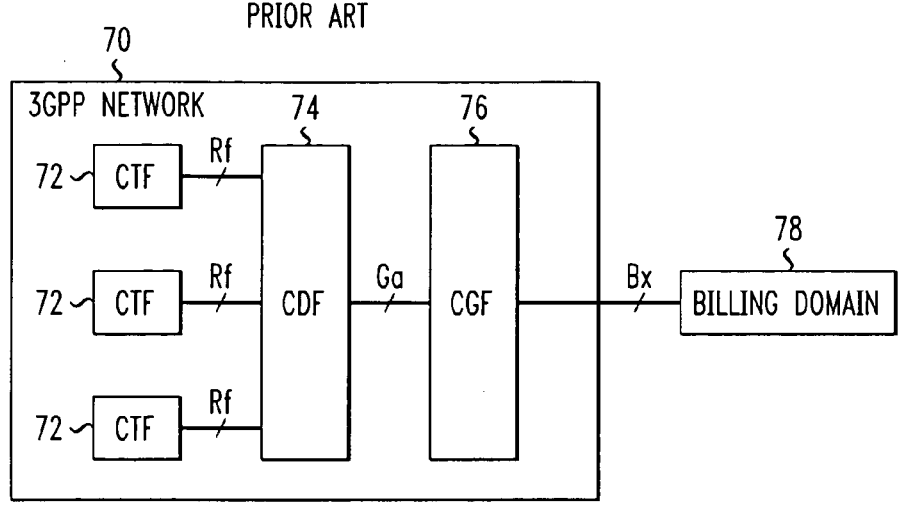
FIG. 2 is a block diagram of an offline charging architecture for a 3GPP network.

Reference is now made to FIG. 2, which illustrates the offline charging architecture for a 3GPP network 70. Each of the IMS network elements (e.g., P-CSCF, I-CSCF, S-CSCF, BGCF, MRFC, MGCF, AS) include a Charging Trigger Function (CTF) 72. The offline charging functionality is based on the IMS network elements reporting accounting information upon reception of various SIP methods or ISUP messages, as most of the accounting relevant information is contained in these messages. This reporting is achieved by sending Diameter Accounting Requests (ACR) (Start, Interim, Stop and Event) from each of the IMS network elements to the Charging Data Function (CDF) 74. The Diameter client uses ACR Start, Interim and Stop in procedures related to successful SIP sessions. It uses ACR Events for unsuccessful SIP sessions and for session unrelated procedures. The network elements involved in the session use the DIAMETER Rf interface to send accounting information to the CDF 74 located in the same domain. The CDF 74 will collect all this information and build a CDR, which is sent via the Charging Gateway Function (CGF) 76 to the Billing Domain (BD) 78. Each session carries an ICID (IMS Charging Identifier) as a unique identifier. Each domain has its own charging network. Billing systems in different domains will also exchange information, so that roaming charges can be applied.

Now, as stated earlier, there may be situations where various entities within the IMS 20 generate multiple call legs for a single incoming event (e.g., Refer, Retry on Error, Redirection, Serial and Parallel Forking). The minimum information required to reconstruct the necessary charging information is: (a) for each call leg, a list of all nodes creating charging records for the call leg, the called party on the call leg, and the final outcome of the call leg; and (b) for each call leg, the identity of the current or previous call leg that provides the called party for the call leg.

Figure 3:
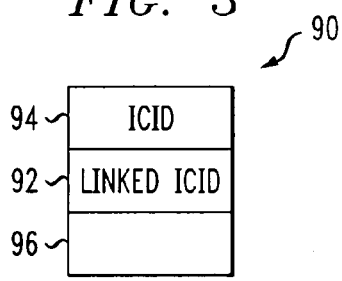
FIG. 3 is a block diagram showing a CDR with a linked ICID field according to aspects of the present invention.

Referring now to FIG. 3, the present invention provides that the IMS entity that initiates a new call leg with an INVITE request upon the occurrence of an event, such as the receipt of a message such as redirection or a timeout, will generate a CDR 90 with an optional Linked ICID field 92. The IMS entity noted above can be the MGCF 26 or other appropriate entity, as known to those skilled in the art. This new field may be in addition to the ICID field 94 and any other fields 96 in the CDR 92. The value of the Linked ICID is set to the ICID of the previous call leg. In other words, the Linked ICID field 92 contains a copy of the charging identifier from the current or previous call leg, which acts as a "link" and thus allows the network to link charging records to reproduce the history of the call.

Figure 4:
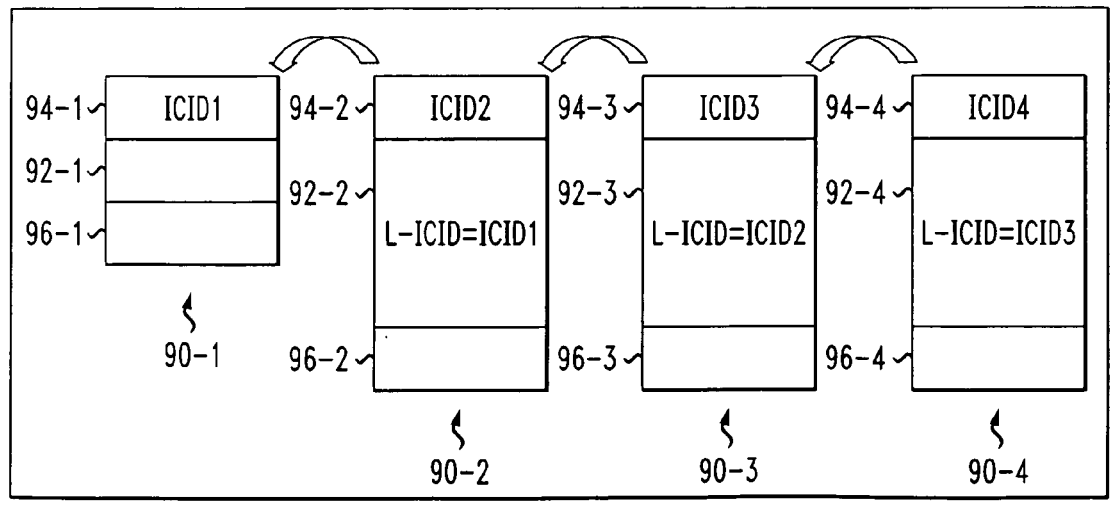
FIG. 4 is a block diagram showing a series of CDRs for a multi-leg call incorporating aspects of the present invention.

FIG. 4 shows a sequence of CDRs (90-1, 90-2, 90-3, 90-4) that have been generated for a multi-leg call. In this example, there are four CDRs shown. It is to be understood, however, that any number of CDRs may be generated, depending upon the number of call legs established during the call session. Typically, there is no Linked ICID field in the first CDR 90-1 since it represents the first call leg. Of course, there may be a Linked ICID field 92-1 that includes a default string such as "L-ICID=0" or similar indication that the field does not contain any usable data. However, the Linked ICID field 92-2 for the second CDR 90-2 includes a copy of the previous ICID for the first charging record, e.g., "L-ICID=ICID1," the Linked ICID field 92-3 for the third CDR 90-3 includes a copy of the ICID for the second charging record, e.g., "L-ICID=ICID2," and the Linked ICID field 92-4 for the fourth CDR 90-4 includes a copy of the ICID for the third charging record, e.g., "L-ICID=ICID3," and so on. This allows for the Billing Domain to correlate all the legs of the call session, thus providing a history of all events for the call.

Each succeeding redirected ICID points back to the previous redirected ICID. Thus, each time an IMS network entity handles the occurrence of an event, such as the receipt of a message such as redirection or a timeout, by initiating a new INVITE request, it also creates a new CDR with a new ICID. A linked list is generated for the Billing Domain to determine the relationship between the initial call leg and each subsequent redirected call leg. The "linked list" is derived from the ACRs and final CDR and is in addition to the existing ICID field and AVP (See, for example, TS 32.298 section 5.1.3.1.15, and TS 32.299 sections 6.1, 6.1.2, and 7.2.36.) The Billing Domain 78 is also capable of determining the network entity that initiated any redirection or similar response associated with each individual call leg, since each call leg is identified with a separate ICID and the redirecting event is captured in the existing CDR. Thus, the Billing Domain 78 can determine each identity associated with all legs of a call and can apply any operator policy desired for charging.

To help illustrate the application of the invention, we will take the case of redirection. It is to be understood, however, that the invention may be implemented in other situations where multiple call legs are generated. Turning now to our redirection example, some sample redirection case scenarios include, but are not limited to: (a) redirection to an MGCF in the same network, (b) redirection to a BGCF in another network, (c) redirection to a non-IMS network, (d) redirection to a different IMS network, redirection to the same IMS network, (e) redirection at UE or I-CSCF, and (f) redirection from a different network.

Under the current standards (3GPP TS 32.260), at each SIP session establishment a new, session specific ICID is generated at the first IMS network element that processes the session-initiating SIP INVITE message, such as the MGCF 26. This ICID is then used by all subsequent nodes in the network to identify the charging event(s) associated with the call. The ACR for each call leg generally has no record of the previous leg's ICID.

Figure 5:
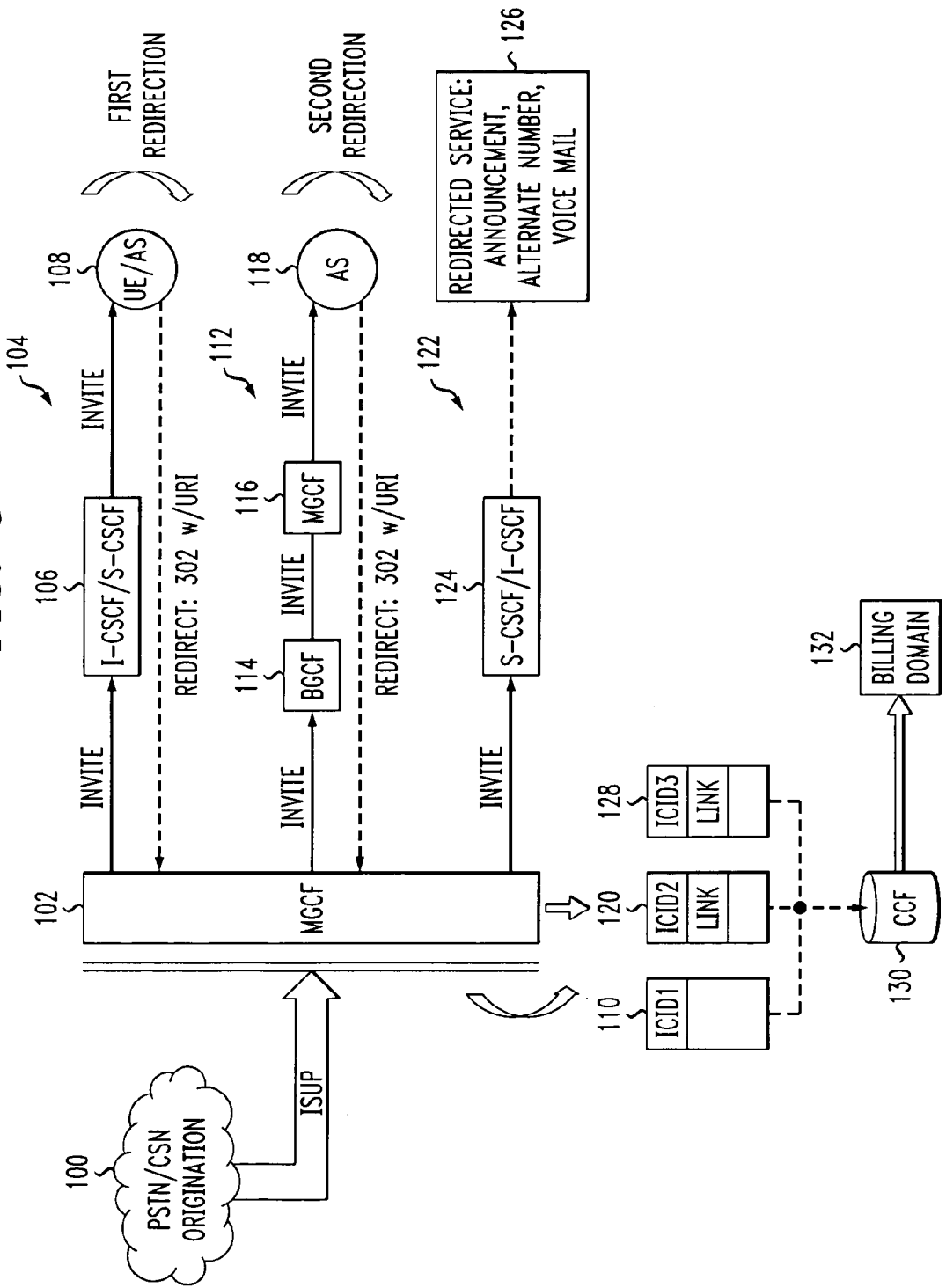
FIG. 5 is a flow diagram for a multi-leg call incorporating aspects of the present invention.

FIG. 5 shows an example of a multi-leg redirection scenario incorporating the present invention. In this example, a call is received from the PSTN 100 at an IMS entity such as a first MGCF 102. The IMS entity could also be an I-CSCF or a BGCF. At this point, a first call leg 104 is set up and the call is routed (via an INVITE request) through the first CSCF 106 to a first called party 108. In this case, the first called party has a redirecting service enabled within an AS. Also, the first MGCF 102 generates a first CDR 110 with ICID1. The first called party 108 may fail the call or respond to the INVITE request with a redirection response (e.g., "300 Multiple Choices," "301 Moved Permanently," or "302 Moved Temporarily") associated with a second IMS network.

In the latter case, a second call leg 112 is set up and the call is re-routed (via an INVITE request) through an IMS entity such as a BGCF 114 and a second MGCF 116 to the second called party 118. Also, the first MGCF 102 generates a second CDR 120 with ICID2 in one field and a link to ICID1 in another field. The second called party 118 may respond to the most recent INVITE request with a redirection response.

The first MGCF 102 chooses to redirect again, and a third call leg 122 is set up. The call is then re-routed (via an INVITE request) through a second CSCF 124 to a third called party 126, which could be any type of redirected service such as announcement, alternate number or voicemail, to name a few. Also, the first MGCF 102 generates a third CDR 128 with ICID3 and a link to ICID2. Finally, the CDRs 110, 118, 128 are forwarded to the CCF 130 and on to the Billing Domain 132. An ACR is created at each session event and is stored in the CDR upon its completion. In this scenario, an ACR is started, and when the call is redirected it is closed. The next leg will start another ACR which may not always be added to the same CDR because of operator implementation differences. Also, because of the sheer volume of activity, the CDRs are not guaranteed to be contiguous in the billing records. Thus, the potential for a break in the chain of chargeable events. The link list in the ACR/CDRs will allow the offline Billing Domain to recreate the events in their correct sequence by examining the CDRs for last/previous ICIDs.

Other examples might show the use of redirection in combination with retry and forking, or show redirection at an AS or I-CSCF, but the charging principles are identical.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of processing multi-leg calls in a communication network, the method comprising:
   receiving a call for a user at a first entity in the network;
   establishing a first call leg to a second entity;
   generating a first charging data record with at least one field, wherein the field contains a charging identifier for the first call leg;
   receiving a response from the second entity;
   establishing a second call leg to a third entity;
   generating a second charging data record with at least two fields, wherein the first field contains a charging identifier for the second call leg and the second field contains a copy of the charging identifier for the first call leg, wherein the charging identifier for the first call leg defines a linked charging identifier that may be used by all subsequent entities in the network to identify at least one charging event associated with the call;
   sending the charging data records to a fourth entity; and
   forwarding the charging data records from the fourth entity to a billing domain, wherein the billing domain recreates charging events that occurred during the call in their correct sequence by examining the charging data records for previous charging identifiers, wherein each of the charging identifiers comprises an IMS Charging Identifier (ICID).

2. The method defined in claim 1, wherein the network comprises an IMS network.

3. The method defined in claim 2, wherein each of the call leg establishing steps is performed using SIP.

4. The method defined in claim 2, wherein at least one of the entities comprises an MGCF.

5. The method defined in claim 4, wherein the fourth entity comprises a CCF.

6. The method defined in claim 2, wherein the second call leg comprises one of the following:
   redirection to an MGCF in the IMS network;
   redirection to a BGCF in a second IMS network;
   redirection to a non-IMS network;
   redirection to a different IMS network;
   redirection to the same IMS network;
   redirection at user equipment or an I-CSCF;
   redirection from a different network; or
   serial forking.

7. A system for processing multi-leg calls in a communication network, the system comprising:
   means for receiving a call for a user at a first entity in the network;
   means for establishing a first call leg to a second entity;
   means for generating a first charging data record with at least one field, wherein the first field contains a charging identifier for the first call leg;
   means for receiving a response from the second entity;
   means for establishing a second call leg to a third entity;
   means for generating a second charging data record with at least two fields, wherein the first field contains a charging identifier for the second call leg and the second field contains a copy of the charging identifier for the first call leg, wherein the charging identifier for the first call leg defines a linked charging identifier that may be used by all subsequent entities in the network to identify at least one charging event associated with the call;
   means for sending the charging data records to a fourth entity; and
   means for forwarding the charging data records from the fourth entity to a billing domain, wherein the billing domain recreates charging events that occurred during the call in their correct sequence by examining the charging data records for previous charging identifiers, and wherein each of the charging identifiers comprises an IMS Charging Identifier (ICID).

8. The system defined in claim 7, wherein the network comprises an IMS network.

9. The system defined in claim 7, wherein the ICID for the first call leg defines a linked ICID that may be used by all subsequent entities in the network to identify at least one charging event associated with the call.

10. The system defined in claim 7, wherein at least one of the entities comprises an MGCF.

11. The system defined in claim 7, wherein the fourth entity comprises a CCF.

12. In a communication network, an apparatus operative to:
   receive a call for a user;
   establish a first call leg to a first entity;
   generate a first charging data record with at least one field, wherein the field contains a charging identifier for the first call leg;
   receive a response from the first entity;
   establish a second call leg to second entity;
   generate a second charging data record with at least two fields, wherein the first field contains a charging identifier for the second call leg and the second field contains a copy of the charging identifier for the first call leg, wherein the charging identifier for the first call leg defines a linked charging identifier that may be used by all subsequent entities in the network to identify at least one charging event associated with the call;
   distribute the charging data records a billing entity; and
   forward the charging data records from the fourth entity to a billing domain, wherein the billing domain recreates charging events that occurred during the call in their correct sequence by examining the charging data records for previous charging identifiers, and wherein each of the charging identifiers comprises an ICID.

13. The apparatus defined in claim 12, wherein the network comprises an IMS network.

14. The apparatus defined in claim 12, wherein at least one of the entities comprises an MGCF.

15. The apparatus defined in claim 12, wherein the billing entity comprises a CCF.

* * * * *